(12) United States Patent
Gou et al.

(10) Patent No.: US 12,421,377 B2
(45) Date of Patent: Sep. 23, 2025

(54) HEAT AGING-RESISTANT AND FLEXIBLE POLYOLEFIN FORMULATION

(71) Applicants: Dow Global Technologies LLC, Midland, MI (US); Rohm and Haas Company, Collegeville, PA (US)

(72) Inventors: Qian Gou, Collegeville, PA (US); Timothy J. Person, Pottstown, PA (US); Paul J. Caronia, Annadale, NJ (US); Yushan Hu, Pearland, TX (US); John Reffner, North Wales, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 786 days.

(21) Appl. No.: 17/755,595

(22) PCT Filed: Nov. 10, 2020

(86) PCT No.: PCT/US2020/059831
§ 371 (c)(1),
(2) Date: May 3, 2022

(87) PCT Pub. No.: WO2021/101753
PCT Pub. Date: May 27, 2021

(65) Prior Publication Data
US 2022/0363876 A1    Nov. 17, 2022

Related U.S. Application Data

(60) Provisional application No. 62/936,717, filed on Nov. 18, 2019.

(51) Int. Cl.
| | |
|---|---|
| *C08L 23/0807* | (2025.01) |
| *C08J 3/28* | (2006.01) |
| *C08J 11/06* | (2006.01) |
| *C08K 5/00* | (2006.01) |
| *C08K 5/01* | (2006.01) |
| *C08L 23/12* | (2006.01) |
| *C08L 53/00* | (2006.01) |
| *H01B 3/44* | (2006.01) |

(52) U.S. Cl.
CPC ............ *C08L 23/0815* (2013.01); *C08J 3/28* (2013.01); *C08J 11/06* (2013.01); *C08K 5/005* (2013.01); *C08K 5/01* (2013.01); *C08L 23/12* (2013.01); *C08L 53/00* (2013.01); *H01B 3/441* (2013.01); *C08J 2323/08* (2013.01); *C08J 2323/12* (2013.01); *C08J 2423/08* (2013.01); *C08J 2423/12* (2013.01); *C08J 2423/16* (2013.01); *C08L 2203/202* (2013.01); *C08L 2205/025* (2013.01); *C08L 2205/03* (2013.01)

(58) Field of Classification Search
CPC ...... C08L 23/0815; C08L 23/12; C08L 53/00; C08L 2205/02; C08L 2205/03; C08K 5/375; C08K 5/01
See application file for complete search history.

(56) References Cited

U.S. PATENT DOCUMENTS

| | | | |
|---|---|---|---|
| 5,451,642 A | 9/1995 | Abe et al. | |
| 6,255,399 B1* | 7/2001 | Castellani | C08L 23/0815 525/240 |
| 6,824,870 B2 | 11/2004 | Castellani et al. | |
| 6,861,143 B2 | 3/2005 | Castellani et al. | |
| 7,514,633 B2 | 4/2009 | Dell'Anna et al. | |
| 8,378,216 B2 | 2/2013 | Perego et al. | |
| 8,716,400 B2 | 5/2014 | Carnahan et al. | |
| 9,334,374 B2 | 5/2016 | Sutton et al. | |
| 9,404,005 B2 | 8/2016 | Sutton et al. | |
| 2002/0188078 A1 | 12/2002 | Castellani et al. | |
| 2007/0027426 A1 | 2/2007 | Matsumura et al. | |
| 2013/0025909 A1 | 1/2013 | Perego et al. | |
| 2015/0087787 A1 | 3/2015 | Sutton et al. | |
| 2019/0136026 A1 | 5/2019 | Wu et al. | |
| 2019/0224945 A1 | 7/2019 | Shimizu et al. | |

(Continued)

FOREIGN PATENT DOCUMENTS

| | | |
|---|---|---|
| CN | 107266833 | 10/2017 |
| EP | 0617077 A1 | 9/1994 |
| EP | 0893801 A1 | 1/1999 |

(Continued)

OTHER PUBLICATIONS

Office Action from corresponding Chinese Application No. 2020800744392.
Office Action from corresponding Japanese Patent Application No. 2022-523641 dated Dec. 20, 2024.
Office Action from corresponding Taiwan Application No. 109137823 dated Apr. 30, 2024.
PCT/US2020/059831, International Search Report and Written Opinion with a mailing date of Mar. 4, 2021.

*Primary Examiner* — Marc S Zimmer
*Assistant Examiner* — Surbhi M Du

(57) ABSTRACT

A polyolefin formulation comprising constituents (A) to (E) in the following amounts: from 15.0 to 55.0 weight percent (wt %) of (A) a polypropylene homopolymer; from 77.9 to 30.0 wt % of (B) a poly(ethylene-co-1-alkene) copolymer; from 3.0 to 6.5 wt % of (C) an ethylene/propylene diblock copolymer; from 4.0 to 8.0 wt % of (D) a saturated-and-aromatic ($C_{14}$-$C_{60}$)hydrocarbon; and from 0.1 to 1.5 wt % of (E) an antioxidant; wherein the wt % of (B) divided by the wt % (A) is a mass ratio of from 5.0:1.0 to 0.50:1.0; and wherein the amounts of constituents (A), (B), and (C) total from 88.0 to 95.9 wt % of the polyolefin formulation; and wherein the amounts of constituents (A) to (E) total from 92.1 to 100.0 wt % of the polyolefin formulation.

10 Claims, No Drawings

(56) References Cited

U.S. PATENT DOCUMENTS

2020/0332101 A1    10/2020   Henschke et al.

FOREIGN PATENT DOCUMENTS

| | | | |
|---|---|---|---|
| EP | 0893802 | A1 | 1/1999 |
| EP | 0893802 | B1 | 3/2004 |
| EP | 0893801 | B1 | 4/2004 |
| EP | 2622013 | B1 | 5/2017 |
| KR | 102038709 | B1 * | 10/2019 |
| WO | 0041187 | A1 | 7/2000 |
| WO | 2000041187 | A1 | 7/2000 |
| WO | 2002047092 | A1 | 6/2002 |
| WO | 2005055250 | A1 | 6/2005 |
| WO | 2007048422 | A1 | 5/2007 |
| WO | 2008058572 | A1 | 5/2008 |
| WO | 2011092533 | A1 | 8/2011 |
| WO | 2012044732 | A1 | 4/2012 |
| WO | 2012069864 | A1 | 5/2012 |
| WO | 2012085612 | A1 | 6/2012 |
| WO | 2013017916 | A1 | 2/2013 |
| WO | 2013171550 | A1 | 11/2013 |
| WO | 2016148950 | A1 | 9/2016 |
| WO | 2016158950 | A1 | 10/2016 |
| WO | 2016182817 | A1 | 11/2016 |
| WO | 2018160402 | A1 | 9/2018 |

* cited by examiner

HEAT AGING-RESISTANT AND FLEXIBLE POLYOLEFIN FORMULATION

Polyolefins, formulations, and related methods and manufactured articles.

INTRODUCTION

Patents and patent application publications in or about the field include EP 0 617 077 A1; EP 0 893 801 A1; EP 0 893 802 A1; U.S. Pat. Nos. 6,824,870 B2; 6,861,143 B2; 7,514,633 B2; 8,378,216 B2; 8,716,400 B2; 9,334,374 B2; 9,404,005 B2; US 2019/0136026 A1; WO 00/041187 A1; WO 2002/047092 A1; WO 2007/048422 A1; WO 2008/058572 A1; WO 2011/092533 A1; WO 2012/044732 A1; WO 2012/069864 A1; WO 2012/085612 A1; WO 2013/017916 A1; WO 2013/171550 A1; WO 2016/158950 A1; and WO 2016/182817 A1.

Polyethylene polymers used in coating layers (e.g., insulation layers) of medium voltage (MV), high voltage (HV), or extra-high voltage (EHV) power cables often have been crosslinked triggered by decomposition of a peroxide additive. Initiating the crosslinking step requires running an uncrosslinked coated conductor through a continuous vulcanization tube. After the resulting crosslinked coated conductor exits the tube it must be degassed to remove volatile crosslinking byproducts. The presence of crosslinks in the crosslinked polyethylene polymers ("XLPE") makes the coating layers difficult to recycle.

SUMMARY

We provide a polyolefin formulation comprising constituents (A) to (E) in the following amounts: from 15.0 to 55.0 weight percent (wt %) of (A) a polypropylene homopolymer; from 77.9 to 30.0 wt % of (B) a poly(ethylene-co-1-alkene) copolymer; from 3.0 to 6.5 wt % of (C) an ethylene/propylene diblock copolymer; from 4.0 to 8.0 wt % of (D) a saturated-and-aromatic ($C_{14}$-$C_{60}$)hydrocarbon; and from 0.1 to 1.5 wt % of (E) an antioxidant; wherein the wt % of (B) divided by the wt % (A) is a mass ratio of from 5.0:1.0 to 0.50:1.0; and wherein the amounts of constituents (A), (B), and (C) total from 88.0 to 95.9 wt % of the polyolefin formulation; and wherein the amounts of constituents (A) to (E) total from 92.1 to 100.0 wt % of the polyolefin formulation.

The polyolefin formulation has improved (increased) flexibility and improved (increased) resistance to the flexibility-decreasing effects of heat-aging (collectively, "initial inventive benefits"). The improved (increased) flexibility is indicated by a flexural modulus of less than 300 megapascals (MPa) and, optionally, a lower flexural modulus relative to that of a comparative formulation. The improved (increased) resistance to heat-aging effects is indicated by the resulting inventive heat-aged polyolefin product having an elongation-at-break of 550 percent (%) or higher, and, optionally, a higher retention of elongation-at-break after heat aging than that of a comparative heat-aged product. The improved (increased) resistance to heat-aging effects may also be indicated by the resulting heat-aged polyolefin product having higher tensile strength after the heat aging relative to that of the comparative heat-aged product.

The polyolefin formulation and heat-aged polyolefin product made therefrom by heat aging are useful in industries that benefit from flexibility and resistance to heat aging, such as, for example, as a coating layer (e.g., insulation layer) of a medium voltage (MV), high voltage (HV), or extra-high voltage (EHV) power cable. Beneficially, the polyolefin formulation does not have to be crosslinked in order to be used as a coating layer (e.g., insulation layer) in such power cables, and therefore the inventive materials and coating layer are beneficially recyclable. The polyolefin formulation and heat-aged polyolefin product may have additional benefits and may be used in other industry applications such as aerospace, automotive, and medical applications.

DETAILED DESCRIPTION

Additional inventive aspects follow; some are numbered below for ease of reference.

Aspect 1. A polyolefin formulation comprising constituents (A) to (E) in the following amounts: from 15.0 to 55.0 weight percent (wt %) of (A) a polypropylene homopolymer; from 77.9 to 30.0 wt % of (B) a poly(ethylene-co-1-alkene) copolymer; from 3.0 to 6.5 wt % of (C) an ethylene/propylene diblock copolymer; from 4.0 to 8.0 wt % of (D) a saturated-and-aromatic ($C_{14}$-$C_{60}$)hydrocarbon; and from 0.1 to 1.5 wt % of (E) an antioxidant; wherein the wt % of (B) divided by the wt % (A) is a mass ratio of from 5.0:1.0 to 0.50:1.0; and wherein the amounts of constituents (A), (B), and (C) total from 88.0 to 95.9 wt % of the polyolefin formulation; and wherein the amounts of constituents (A) to (E) total from 92.1 to 100.0 wt % of the polyolefin formulation.

Aspect 2. The polyolefin formulation of aspect 1 wherein the polyolefin formulation has features (i) and (ii) and, optionally, feature (iii): (i) a flexural modulus of less than 300 megapascals (MPa, e.g., from 15 to 299 MPa) measured according to ASTM D790-15e2; and (ii) an elongation-at-break of greater than or equal to 550 percent (%, alternatively greater than 600%, e.g., from 605% to 850%) measured according to ASTM D638-14; and, optionally, (iii) a tensile strength of greater than 8.5 MPa (i.e., >1233 pounds per square inch (psi)) (e.g., from 8.51 to 26.9 MPa) measured according to ASTM D638-14.

Aspect 3. The polyolefin formulation of aspect 1 or 2 wherein subjecting the unaged polyolefin formulation to heat aging for 10 days at 135 degrees Celsius (° C.) yields a heat-aged polyolefin product that has feature (i) and, optionally, feature (ii): (i) (i) an elongation-at-break of greater than 350 percent (%, e.g., from 355% to 700%, alternatively greater than 450%, alternatively greater than 550%, e.g., from 550% to 695%) measured according to ASTM D638-14; and, optionally, (ii) a tensile strength of greater than 8.5 MPa (e.g., from 8.51 to 26.9 MPa) measured according to ASTM D638-14.

Aspect 4. The polyolefin formulation of any one of aspects 1 to 3, wherein the polyolefin formulation has from 16.0 to 54.0 wt % of the (A) polypropylene homopolymer; from 72.0 to 35.4 wt % of the (B) poly(ethylene-co-1-alkene) copolymer; from 4.0 to 6.0 of the (C) ethylene/propylene diblock copolymer; from 5.0 to 7.0 wt % of the (D) saturated-and-aromatic ($C_{14}$-$C_{60}$)hydrocarbon; and from 0.1 to 1.0 wt % of the (E) antioxidant; wherein the wt % of (B) divided by the wt % (A) is a mass ratio of from 4.5:1.0 to 0.60:1.0; and wherein the amounts of constituents (A), (B), and (C) total from 88.0 to 94.9 wt % of the polyolefin formulation; and wherein the amounts of constituents (A) to (E) total from 93.0 to 100.0 wt % of the polyolefin formulation.

Aspect 5. The polyolefin formulation of any one of aspects 1 to 4 having any one of features (i) to (v): (i) the (A) polypropylene homopolymer has a density from 0.89 to 0.93 gram per cubic centimeter (g/cm³) (e.g., 0.90 to 0.92 g/cm³) measured according to ASTM D792-13, method B, and a melt flow rate (MFR$_2$) from 1.0 to 10 grams per 10 minutes (g/10 min.) (e.g., from 1.5 to 4.0 g/10 min.) measured according to ASTM D-1238 at 230° C., 2.16 kg; (ii) wherein the (B) poly(ethylene-co-1-alkene) copolymer is a poly (ethylene-co-1-butene) copolymer that has a density from 0.850 to 0.890 g/cm³ (e.g., 0.865 to 0.874 g/cm³) measured according to ASTM D792-13, method B, and a melt index (I$_2$) from 0.1 to 5.0 g/10 min. (e.g., a melt index from 0.1 to 0.5 g/10 min. measured according to ASTM D-1238 at 190° C., 2.16 kg (e.g., and optionally an ethylenic content of at least 85.0 wt %, based on the total weight of (B)); (iii) wherein the (C) ethylene/propylene diblock copolymer has a melt flow rate (MFR2) from 4 to 8 g/10 min. measured according to ASTM D-1238 at 260° C., 2.16 kg; (iv) wherein the (D) saturated-and-aromatic ($C_{14}$-$C_{60}$)hydrocarbon is a saturated-and-aromatic ($C_{19}$-$C_{23}$)hydrocarbon, alternatively a saturated-and-aromatic ($C_{21}$)hydrocarbon, alternatively an unsubstituted dibenzyltoluene; (v) wherein the antioxidant is a sulfur atom-containing compound. In some embodiments the polyolefin formulation has a combination of any one of features (vi) to (xvii): (vi) both (i) and (ii); (vii) both (i) and (iii); (viii) both (i) and (iv); (ix) both (i) and (v); (x) both (ii) and (iii); (xi) both (ii) and (iv); (xii) both (ii) and (v); (xiii) both (iii) and (iv); (xiv) both (iii) and (v); (xv) both (iv) and (v); (xvi) any four of (i) to (v); (xvii) each of (i) to (v).

Aspect 6. A method of making the polyolefin formulation of any one of aspects 1 to 5, comprising melt-mixing constituents (A), (B), and (C) at a temperature of from 180 to 220 degrees Celsius (° C.) for a mixing-effective period of time to give a premixture of constituents (A), (B), and (C) and free of constituents (D) and (E); and soaking or imbibing constituents (D) and (E) into the premixture at a temperature from 80° to 100° C. for an absorbing-effective period of time of at least 4 hours to give the polyolefin formulation comprising constituents (A) to (E). The mixing-effective period of time may be from 0.1 to 2 hours, alternatively from 0.2 to 1.0 hour, alternatively from 0.1 to 0.5 hour. The atmosphere used in the melt-mixing and/or soaking or imbibing steps may be an inert atmosphere (e.g., a gas consisting of nitrogen gas, argon gas, helium gas, or a combination of any two or more thereof). The melt-mixing step may be performed according to the Melt Mixing Preparation Method described later. The soaking or imbibing step may be performed according to the Soaking or Imbibing Preparation Method described later.

Aspect 7. A heat-aged polyolefin product made by subjecting the polyolefin formulation of any one of aspects 1 to 5 to heat aging conditions comprising a temperature of from 50 to 140 degrees Celsius (° C.) and a heat aging-effective time period of 10 days or longer and an air atmosphere. The heating time period may be continuous or intermittent. The subjecting step may be performed according to the Heat Aging Method described later. Embodiments of the polyolefin formulation of any one of aspects 1 to 5 may be made by the method of aspect 6. The method of aspect 6 makes the polyolefin formulation as an "unaged" polyolefin formulation, which means a polyolefin formulation that has not been subjected to the heat aging of conditions described in aspect 7. Differences between the method of aspect 6 and the heat aging conditions of aspect 7 are the method of aspect 6 is completed in a substantially shorter time period than the heat aging-effective time period and the method of aspect 6 may be performed under an inert atmosphere, whereas the heat aging may be performed under air atmosphere.

Aspect 8. A manufactured article comprising or made from the polyolefin formulation of any one of aspects 1 to 5 or the heat-aged polyolefin product of aspect 7.

Aspect 9. A coated conductor comprising a conductive core and an insulation layer comprising the polyolefin formulation of any one of aspects 1 to 5 or the heat-aged polyolefin product of aspect 7 at least partially covering the conductive core.

Aspect 10. A method of conducting electricity, the method comprising applying a voltage across the conductive core of the coated conductor of aspect 9 so as to generate a flow of electricity through the conductive core.

Aspect 11. A method of recycling the polyolefin formulation of any one of aspects 1 to 5 or contained in the manufactured article of aspect 8 or in the insulation layer of the coated conductor of aspect 9, the method comprising crushing the polyolefin formulation to give a crushed product, and pelletizing the crushed product to give pellets of recycled polyolefin formulation.

The polyolefin formulation has improved (increased) flexibility and improved (increased) resistance to the flexibility-decreasing effects of heat-aging (collectively, "initial inventive benefits"). The improved (increased) flexibility is indicated by a flexural modulus before heat aging of from 15 to 300 MPa, alternatively from 15.5 to 290 MPa, alternatively from 120 to 290 MPa, alternatively from 131 to 287 MPa, measured according to ASTM D790-15e2. The improved (increased) resistance to heat-aging effects may be indicated by the resulting heat-aged polyolefin formulation having an elongation-at-break of at least 350%, alternatively at least 450%, alternatively at least 550%, alternatively at least 570%, measured according to ASTM D638-14. E.g., embodiments of the heat-aged polyolefin formulation may have an elongation-at-break of from 350% to 820%, alternatively from 450% to 650%, alternatively from 550% to 630%. Later inventive examples of the polyolefin formulation and comparative examples of comparative formulations will show that the initial inventive benefits are an unpredictable result of the choices of compositions for the constituents (A) to (E) and their absolute and relative amounts.

Embodiments of the polyolefin formulation may have additional benefits. For example, embodiments of the polyolefin formulation may have a tensile strength before and/or after heat aging that is greater than 8.5 MPa (i.e., greater than 1233 pounds per square inch (psi)), alternatively greater than 12.4 MPa, alternatively from 12.5 to 24.9 MPa, measured according to ASTM D638-14. The improved (increased) resistance to heat-aging effects may also be indicated by the resulting heat-aged polyolefin product having tensile strength of greater than 8.5 MPa (e.g., from 8.51 to 26.9 MPa) after the heat aging relative to that of the comparative heat-aged product.

We also provide six additional inventive embodiments that are the same as aspects 1 to 6 and four additional inventive embodiments that are the same as aspects 8 to 11 depending from any one of aspects 1 to 5 except wherein the polyolefin formulation of the ten additional inventive embodiments has a flexural modulus of less than 400 MPa, alternatively from 15 to 399 MPa, alternatively from 300.1 to 399 MPa, measured according to ASTM D790-15e2. We also provide one additional inventive embodiment that is the same as aspect 7 and four additional inventive embodiments that are the same as aspects 8 to 11 depending from aspect 7 except wherein subjecting the polyolefin formulation having a flexural modulus of less than 400 MPa to heat aging for 10 days at 135° C. yields a heat-aged polyolefin product that has a flexural modulus of less than 400 MPa, alternatively from 15 to 399 MPa, alternatively from 300.1 to 399 MPa, measured according to ASTM D790-15e2.

The polyolefin formulation. The polyolefin formulation comprises the constituents (A) to (E) and has not been subjected to heat aging conditions. The total amount of all constituents in the polyolefin formulation is 100.0 wt %. The properties of the polyolefin formulation may be compared to the same properties measured on a heat-aged polyolefin product made by heat-aging the polyolefin formulation under heat aging conditions as described earlier in aspect 7 or later in the Heat Aging Method.

For purposes of characterizing the properties of the polyolefin formulation as an "unaged" polyolefin formulation, the polyolefin formulation is made as a substantially uniform mixture comprising constituents (A) to (E) in the claimed amounts, such as by melt mixing or melt compounding as described herein, and once the polyolefin formulation has been made it is compression-molded into a plaque specimen for testing. The specimen is stored in air having 50% relative humidity at a temperature of 23° C. until its properties can be measured.

The polyolefin formulation has improved dispersion of constituents (A) to (E) relative to dispersion of a comparative formulation that has constituent (E) and only three of constituents (A) to (D). The improved dispersion may be determined by scanning electron microscopy (SEM) of a slice of a pellet of the formulation. As shown by SEM images of IE1, CE1, and CE2 before and after heat aging (none shown), the inventive polyolefin formulation will show smaller domains for the discontinuous phase dispersed more uniformly in a continuous phase, as compared to the comparative formulation.

The polyolefin formulation may be as described by any one of the numbered aspects or claims. Alternatively, the polyolefin formulation may be as described by any one of the numbered aspects or claims except wherein one of the features of the numbered aspect or claim is amended based on any one of inventive examples IE1 to 1IE4 described later. For example, an endpoint of a featured range in one of the numbered aspects or claims may be amended to a value given in any one of IE1 to 1IE4. Alternatively, a composition of a featured constituent in any one of the numbered aspects or claims may be amended to a composition given in any one of IE1 to 1IE4. Thus, the inventive examples may serve as explicit basis for an amendment to the claims.

The (A) polypropylene homopolymer. Constituent (A) is an organic macromolecule that has a propylene monomeric content of 100 wt % based on the weight of the polypropylene homopolymer. The (A) polypropylene homopolymer is different in composition and function than the constituents (B) to (E). Some embodiments of constituent (A) may have a melt flow rate (MFR) from 1.0 to 100.0 grams per 10 minutes (g/10 min.) measured according to ASTM D-1238, 230° C., 2.16 kilograms (kg).

Examples of (A) are the polypropylene homopolymers from Braskem, including the INSPIRE family of polypropylene homopolymers.

The polyolefin formulation may have from 15.0 to 55.0 wt %, alternatively from 15.5 to 54.4 wt %, alternatively from 16.1 to 54.0 wt % (e.g., 16.4 wt %, 35.1 wt %, 44.5 wt %, or 53.9 wt %) of constituent (A). If the amount of constituent (A) in the polyolefin formulation exceeds 55 wt %, the polyolefin formulation may not have sufficient flexibility, that is the polyolefin formulation may have a flexural modulus that is too high, i.e., greater than 300 MPa. If the amount of constituent (A) in the polyolefin formulation is less than 15 wt %, the polyolefin formulation may not have sufficient tensile strength before and/or after heat aging, that is the polyolefin formulation may have a tensile strength that is less than 8.5 MPa. If the amount of (A) in the polyolefin formulation is less than 15 wt %, the polyolefin formulation may deform (lose its shape, e.g., warp or sag) at high temperature (e.g., 130° C. or higher).

The (B) poly(ethylene-co-1-alkene) copolymer. Constituent (B) is an organic macromolecule that has an ethylene monomeric content of from 99.0 to 50.0 wt %, alternatively from 99.0 to 85.0 wt %, and a 1-alkene comonomeric content of from 1.0 to 50.0 wt %, alternatively from 1.0 to 15.0 wt %, based on the weight of the poly(ethylene-co-1-alkene) copolymer. The (B) poly(ethylene-co-1-alkene) copolymer is different in composition and function than the constituents (A) and (C) to (E). Some embodiments of constituent (B) may have a melt index ($I_2$) from 0.1 to 50.0 g/10 min. measured according to ASTM D-1238 (190° C., 2.16 kg).

Examples of (B) are commercially available and include ENGAGE™ family of polyolefin elastomers available from The Dow Chemical Company, Midland, Michigan, USA. ENGAGE™ polymers are ethylene/1-butene or ethylene/1-octene copolymers that typically have the following properties: molecular weight distribution narrow to moderate; $I_2$ from <0.5 to 30 g/10 min. (190° C., 2.16 kg, ASTM D1238); density from 0.857 to 0.910 g/cm$^3$ (ASTM D792, Method B); glass transition temperature (Tg) from −61° to −35° C.; melting transition range from 36° to 103° C. (also referred to as DSC Melting Peak (rate 10° C./minute)); Shore A Hardness from 56 to 96 (ASTM D2240); and flexural modulus from 3 to 110 megapascals (MPa, ASTM D790). Examples of suitable ENGAGE™ ethylene/1-octene copolymers are ENGAGE™ 8003, 8100, 8107, 8130, 8137, 8150, 8157, 8180, 8187, 8200, 8207, 8400, 8401, 8402, 8407, 8411, 8440, 8450, 8452, 8480, 8540, and 8842. Examples of suitable ENGAGE™ ethylene/1-butene copolymers are ENGAGE™ 7256, 7270, 7277, 7367, 7447, 7457, and 7467. DSC means differential scanning calorimetry.

The polyolefin formulation may have from 77.9 to 30.0 wt %, alternatively from 34.5 to 75.0 wt %, alternatively from 35.0 to 73.0 wt % (e.g., 72.6 wt %, 53.9 wt %, 44.5 wt %, or 35.1 wt %) of constituent (B). If the amount of constituent (B) in the polyolefin formulation exceeds 78 wt %, the polyolefin formulation may be too flexible, that is the polyolefin formulation may have a flexural modulus that is too low, i.e., less than 15 MPa. If the amount of constituent (B) in the polyolefin formulation is less than 35 wt %, the polyolefin formulation may not have sufficient tensile strength before and/or after heat aging, that is the polyolefin formulation may have a tensile strength that is less than 8.5 MPa. If the amount of (B) in the polyolefin formulation is less than 35 wt %, the polyolefin formulation may have a flexural modulus that is too high (i.e., the polyolefin formulation may be too rigid) and/or the polyolefin formulation after heat aging may have elongation-at-break that is too low (i.e., the polyolefin formulation may be too brittle).

The (C) ethylene/propylene diblock copolymer. Constituent (C) is an organic macromolecule that has a first monovalent segment having an ethylene monomeric content of from 95 to 100 wt %, based on weight of the first segment; and a second monovalent segment that has a propylene comonomeric content of from 95 to 100 wt, based on the weight of the second segment, wherein the first monovalent segment is covalently bonded to the second monovalent segment, thereby forming a diblock copolymer. The (C)

ethylene/propylene diblock copolymer is different in composition and function than the constituents (A), (B), (D), and (E). Some embodiments of constituent (C) may have a melt flow rate (MFR) from 1.0 to 50 g/10 min., alternatively from 3 to 20 g/10 min., alternatively from 4.0 to 10.0 g/10 min., alternatively from 5 to 8 g/10 min. (e.g., 6.5 g/10 min.) measured according to ASTM D-1238, 230° C., 2.16 kg.

Examples of (C) ethylene/propylene diblock copolymers are the block composites described in U.S. Pat. No. 8,716,400 B2. Ethylene/propylene diblock copolymers of the INTUNE™ family of olefin block copolymers from The Dow Chemical Company are also examples of such (C).

The polyolef in formulation may have from 3.0 to 6.5 wt %, alternatively from 3.5 to 5.9 wt %, alternatively from 4.2 to 5.2 wt % (e.g., 4.7 wt %) of constituent (C). If the amount of constituent (C) in the polyolef in formulation exceeds 6.5 wt %, the polyolefin formulation may not have sufficient elongation-at-break before and/or after heat aging, that is the polyolefin formulation may have an elongation-at-break that is too low, i.e., less than 550% before heat aging and/or less than 350% after heat aging. If the amount of constituent (C) in the polyolefin formulation is less than 3.0 wt %, the polyolefin formulation may not have sufficient flexibility, that is the polyolefin formulation may have a flexural modulus that is too high, i.e., greater than 300 MPa.

The (D) saturated-and-aromatic ($C_{14}$-$C_{60}$)hydrocarbon. The saturated-and-aromatic ($C_{14}$-$C_{60}$)hydrocarbon is an organic compound that consists of from 1 to 6 saturated carbon atoms and from 1 to 4 aryl groups independently selected from phenyl, naphthyl, and biphenyl groups and that is free of carbon-carbon double bonds and carbon-carbon triple bonds. The (D) saturated-and-aromatic ($C_{14}$-$C_{60}$)hydrocarbon is different in composition and function than the constituents (A) to (C) and (E). Constituent (D) may be a saturated-and-aromatic ($C_{31}$-$C_{60}$)hydrocarbon, a saturated-and-aromatic ($C_{20}$-$C_{40}$)hydrocarbon, saturated-and-aromatic ($C_{14}$-$C_{30}$)hydrocarbon, or a saturated-and-aromatic ($C_{16}$-$C_{22}$)hydrocarbon. Constituent (D) may be a saturated-and-aromatic ($C_{19}$-$C_{23}$)hydrocarbon, alternatively a saturated-and-aromatic ($C_{21}$)hydrocarbon, alternatively an unsubstituted dibenzyltoluene. Constituent (D) may consist of one or more compounds of formula (I): $CH_{4-x}(R^1)(R^2)(R^3)_x(I)$, wherein subscript x is an integer of 3 or 4; $CH_{4-x}$ is a multivalent radical of benzene wherein the valency is equal to the sum x+2; $R^1$ is a ($C_1$-$C_3$)alkyl group; and $R^2$ and $R^3$ independently are a ($C_7$-$C_{10}$)aralkyl group. Constituent (D) may be a benzyltoluene, a dibenzyltoluene, a tribenzyltoluene, or a combination of any two or more thereof. Constituent (D) may be a dibenzyl toluene; alternatively a dibenzyltoluene selected from 1,2-dibenzyl-3-methylbenzene, 1,3-dibenzyl-4-methylbenzene, and 1,4-dibenzyl-5-methylbenzene; alternatively a dibenzyltoluene selected from 1,2-dibenzyl-3-methylbenzene and 1,3-dibenzyl-5-methylbenzene. Constituent (D) may be 1,2-dibenzyl-3-methylbenzene.

The polyolefin formulation may have from 4.0 to 8.0 wt %, alternatively from 4.5 to 7.4 wt %, alternatively from 4.0 to 6.4 wt %, alternatively from 5.5 to 6.9 wt %, alternatively from 5.5 to 6.4 wt %, alternatively from 5.9 to 6.1 wt % (e.g., 6.0 wt %) of constituent (D). If the amount of constituent (D) in the polyolefin formulation exceeds 8 wt %, the polyolefin formulation may sweat out constituent (D), that is the constituent (D) may be in excess of what can remain dispersed in the polyolefin formulation and the excess of (D) may migrate to the surfaces of the polyolefin formulation. If the amount of constituent (D) in the polyolefin formulation is less than 4 wt %, the polyolefin formulation may not have sufficient flexibility as indicated by flexural modulus and/or resistance to heat aging as indicated by the elongation-at-break after heat aging.

The (E) antioxidant. Constituent (E) is an organic molecule that inhibits oxidation, or a collection of such molecules. The (E) antioxidant is different in composition and function than the constituents (A) to (D). The (E) antioxidant functions to provide antioxidizing properties to the polyolefin formulation and heat-aged product of heat-aging same. Examples of suitable (E) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800), stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024). The (E) may be a sulfur atom-containing compound or a combination of any two or more thereof (i.e., an organic molecule containing a covalent C—S bond, e.g., any one or more of the aforenamed compounds that have "thio" in the name). The (E) may be 4,6-bis(octylthiomethyl)-o-cresol (i.e., 4,6-bis(octylthiomethyl)-2-methylphenol or 4,6-di(octylthiomethyl)-2-methylphenol). The combination of sulfur atom-containing compounds may be 4,6-bis(octylthiomethyl)-o-cresol and distearyl thiodipropionate.

The (E) antioxidant may be from 0.1 to 1.0 wt %, alternatively 0.15 to 0.5 wt %, alternatively from 0.25 to 0.34 wt % (e.g., 0.3 wt %) of the polyolefin formulation. If the amount of constituent (E) in the polyolefin formulation exceeds 1.0 wt %, the polyolefin formulation may not have sufficient flexibility as measured by flexural modulus. If the amount of constituent (E) in the polyolefin formulation is less than 0.1 wt %, the polyolefin formulation may not have sufficient resistance to heat aging.

Some embodiments of the polyolefin formulation may further comprise one or more optional additives. The optional additive may be constituent (F): a hindered-amine stabilizer for stabilizing the polyolefin formulation against effects of ultraviolet (UV) light. Constituent (F) hindered-amine stabilizer is different in composition than constituents (A) to (E). Constituent (F) may be a hindered amine light stabilizer (HALS). Examples are a hindered amine light stabilizer (HALS), a benzophenone, or a benzotriazole. The (F) UV stabilizer may be a molecule that contains a basic nitrogen atom that is bonded to at least one sterically bulky organo group and functions as an inhibitor of degradation or decomposition, or a collection of such molecules. The HALS is a compound that has a sterically hindered amino functional group and inhibits oxidative degradation. Examples of suitable (F) are butanedioic acid dimethyl ester, polymer with 4-hydroxy-2,2,6,6-tetramethyl-1-piperidine-ethanol (CAS No. 65447-77-0, commercially LOWILITE 62); and N,N'-bisformyl-N,N'-bis(2,2,6,6-tetramethyl-4-piperidinyl)-hexamethylenediamine (CAS No. 124172-53-8, commercially Uvinul 4050 H). The formulation and product may be free of (F). When present, the (F) UV stabilizer may be from 0.001 to 1.5 wt %, alternatively 0.002 to 1.0 wt %, alternatively 0.05 to 0.1 wt % of the polyolefin formulation.

The polyolefin formulation may be free of certain additives. For example, the polyolefin formulation may be free of a peroxide and/or a filler and/or an alkenyl-functional coagent. Examples of such peroxide are those used in crosslinking of polyolefins, such as those described in WO 2018/160402 A1, such as dicumyl peroxide. Examples of such a filler are carbon black, quartz, silica, talc, and titanium dioxide. Examples of such alkenyl-functional coagent are triallyl cyanurate (TAC); triallyl isocyanurate (TAIC); triallyl trimellitate ("TATM"); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; and triallyl aconitate.

Embodiments of the polyolefin formulation are not peroxide-crosslinkable and/or are not crosslinked. The polyolefin formulation of such embodiments is thermoplastic and is free of a peroxide and free of an alkenyl-functional coagent. The thermoplastic polyolefin formulation is useful as a coating layer (e.g., insulation layer) in power cables, and are recyclable.

Other embodiments of the polyolefin formulation further comprise an organic peroxide (e.g., dicumyl peroxide) and, therefore, are peroxide-crosslinkable. Such embodiments may further comprise the alkenyl-functional coagent. In some embodiments such peroxide-crosslinkable polyolefin formulation is heated to make an inventive crosslinked polyolefin product.

Any compound, composition, formulation, mixture, or product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that any required chemical elements (e.g., C and H required by a polyolefin; or Hf required by M=Hf) are not excluded.

Alternatively precedes a distinct embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. ISO is International Organization for Standardization, Chemin de Blandonnet 8, CP 401-1214 Vernier, Geneva, Switzerland. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). PAS is Publicly Available Specification, Deutsches Institut für Normunng e.V. (DIN, German Institute for Standardization) Properties may be measured using standard test methods and conditions. Ranges include endpoints, subranges, and whole and/or fractional values subsumed therein, except a range of integers does not include fractional values. Room temperature: 23° C.±1° C.

Terms used herein have their IUPAC meanings unless defined otherwise. For example, see Compendium of Chemical Terminology. Gold Book, version 2.3.3, Feb. 24, 2014.

For present purposes, the flexural modulus, elongation-at-break, and tensile strength of a test material may be measured on compression-molded plaque specimens before and after the specimens have been subjected to heat aging according to the Heat Aging Method. The result may be reported as an average of five measurements made on five compression-molded plaque specimens of the same test material.

Melt Mixing Preparation Method for preparing examples of the inventive polyolefin formulation and examples of comparative formulations: melt-mix constituents (A), (B), and (C) under a nitrogen gas atmosphere in a counter-rotating, intermeshing, conical twin-screw extruder ("conical TSE") having twin screws each having diameters of 32 millimeters (mm) and lengths of 330.7 mm and screw speeds of 10 rotations per minute (rpm). The conical TSE has three consecutive segments and the melt mixing uses a temperature profile of 180° C. in the first segment, 200° C. in the second segment, and 210° C. in the third segment and gives in the third segment a premixture of constituents (A), (B), and (C) and free of constituents (D) and (E). Extrude a strand of the premixture from the third segment through a single hole die into an underwater Berlyn pelletizer to yield the premixture of constituents (A) to (C) as uniform pellets.

Soaking or Imbibing Preparation Method: Pre-heat the pellets of the premixture of constituents (A) to (C), the pellets having been made by the Melt Mixing Preparation Method, in a 90° C. oven under a nitrogen gas atmosphere for at least 4 hours in a glass container. Remove glass container and contents from the oven, then add to the pre-heated pellets in the container constituents (D) and (E). Shake the resulting mixture of constituents (A) to (E) briefly, then tumble the pellets with (D) and (E) at 30 rpm for 10 minutes until the pellets have absorbed all of (D) and (E), i.e., until (D) and (E) have soaked or imbibed into the pellets. Place the resulting soaked pellets into the 90° C. oven under a nitrogen gas atmosphere for at least 10 hours to give the polyolefin formulation comprising constituents (A) to (E) in form of pellets. Comparative formulations may be made in an analogous manner except one or two of the constituents may be omitted from the comparative formulation or one of the constituents may be used in a non-inventive amount.

Compression-Molded Plaque Specimen Preparation Method: make each compression-molded plaque specimen of a test material by compression molding pellets of the test material in a press under a pressure of 3.5 MPa (500 psi) and at a temperature of 125° C. for 3 minutes, followed by a pressure of 17 MPa (2500 psi) at a temperature of 125° C. for 3 minutes, followed by a pressure of 17 MPa at a temperature of 200° C. for 12 minutes, then cooling the compression-molded plaque specimen to 30° C. under a pressure of 17 MPa, then opening the press to give the compression-molded plaque specimen. The pellets of the test material are made according to the Soaking or Imbibing Preparation Method.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter ($g/cm^3$).

Elongation-at-Break Test Method: measured according to ASTM D638-14, *Standard Test Method for Tensile Properties of Plastics*, using a displacement rate of 5.08 centimeters per minute (cm/min.) on five compression-molded plaque specimens made according to the Compression-Molded Plaque Specimen Preparation Method from a same test material, and then averaging the five results. Report result in percent (%) elongation-at-break.

Flexural Modulus Test Method: measured at 23° C. according to ASTM D790-15e2, *Standard Test Methods for Flexural Properties of Unreinforced and Reinforced Plastics and Electrical Insulating Materials*, measured at 0.05 inch/minute (0.127 cm/minute) on compression-molded plaque specimens of 3.18 millimeters (125 mils) thickness with a crosshead position, and expressed in pounds per square inch (psi) or the equivalent megapascals (MPa).

Heat Aging Method: keep a test material or compression-molded plaque specimen in a Type II ASTM D5423-93 Testing Mechanical Convection Oven set at 135° C. for 10 days under an air atmosphere to give a heat-aged test material or heat-aged plaque specimen, respectively.

Melt Index ($I_2$) Test Method: used for polyethylene polymers, measured according to ASTM D1238-04, *Standard Test Method for Melt Flow Rates of Thermoplastics by Extrusion Platometer*, using conditions of 190° C./2.16 kilograms (kg), formerly known as "Condition E". Report results in units of grams eluted per 10 minutes (g/10 min.) or the equivalent in decigrams per 1.0 minute (dg/1 min.). 10.0 dg=1.00 g. Melt index is inversely proportional to the weight average molecular weight of the polyethylene, although the inverse proportionality is not linear. Thus, the higher the molecular weight, the lower the melt index.

Melt Flow Rate (MFR) Test Method: used for polypropylene polymers, measured according to ASTM D-1238 using conditions of 230° C. or 260° C. and 2.16 kg.

Tensile Strength Test Method: (stress at break) measured according to ASTM D638-14 using a displacement rate of 5.08 cm/min. on five compression-molded plaque specimens made according to the Compression-Molded Plaque Specimen Preparation Method from a same test material, and then averaging the five results. Report result in megapascals (MPa).

EXAMPLES

Constituent Example (A)-1: a polypropylene homopolymer having a density of from 0.90 to 0.92 g/cm³ and a melt flow rate (MFR) of 3 g/10 min. measured at 230° C., 2.16 kg. Available from Braskem as product FF030F2.

Constituent Example (B)-1: a poly(ethylene-co-1-butene) copolymer having a density of 0.87 g/cm³ and a melt index ($I_2$) of less than 0.5 g/10 min. (e.g., 0.4 g/10 min.). Available from The Dow Chemical Company as product ENGAGE™ HM 7387.

Constituent Example (C)-1: an ethylene/propylene diblock copolymer having a melt flow rate (MFR) of 6.5 g/10 min. measured at 260° C., 2.16 kg. Available from The Dow Chemical Company as product INTUNE™ D5535.

Constituent Example (D)-1: a dibenzyltoluene available from Sasol Germany GmbH as Marlotherm SH.

Constituent Example (E)-1: 4,6-bis(octylthiomethyl)-o-cresol available as Irgastab Cable KV10 from BASF.

Inventive Examples 1 to 4 (IE1 to IE4): made as unaged polyolefin formulations according to the Soaking or Imbibing Preparation Method and having the compositions shown in Table 1 and mechanical properties shown in Tables 2 and 3. Heat-age the polyolefin formulations of IE1 to IE4 according to the Heat Aging Method to give heat-aged polyolefin products of IE1 to IE4, respectively, having the mechanical properties shown in Tables 2 and 3.

Comparative Examples 1 to 4 (CE1 to CE4): made as unaged comparative formulations according to the Soaking or Imbibing Preparation Method and having the compositions shown in Table 1 and mechanical properties shown in Tables 2 and 3. Heat-age the comparative formulations of CE1 to CE4 according to the Heat Aging Method to give heat-aged comparative products of CE1 to CE4, respectively, having the mechanical properties shown in Tables 2-3.

TABLE 1

Compositions of IE1 to IE4 and CE1 to CE4.

| Ex. No. | (A)-1 (wt %) | (B)-1 (wt %) | (C)-1 (wt %) | (D)-1 (wt %) | (E)-1 (wt %) | Total (wt %) |
|---|---|---|---|---|---|---|
| IE1 | 16.4 | 72.6 | 4.7 | 6.0 | 0.3 | 100.0 |
| IE2 | 35.1 | 53.9 | 4.7 | 6.0 | 0.3 | 100.0 |
| IE3 | 44.5 | 44.5 | 4.7 | 6.0 | 0.3 | 100.0 |
| IE4 | 53.9 | 35.1 | 4.7 | 6.0 | 0.3 | 100.0 |
| CE1 | 46.85 | 46.85 | 0 | 6.0 | 0.3 | 100.0 |
| CE2 | 47.5 | 47.5 | 5.0 | 0 | 0 | 100.0 |
| CE3 | 46.85 | 0 | 46.85 | 6.0 | 0.3 | 100.0 |
| CE4 | 72.6 | 16.4 | 4.7 | 6.0 | 0.3 | 100.0 |

As seen from Table 1, unaged inventive polyolefin formulations IE1 to IE4 contain constituents (A) to (E) in the claimed amounts. Unaged comparative formulations CE1 to CE4 either are missing one of constituents (A) to (E) (CE1 and CE3), missing two of constituents (A) to (E) (CE2), or contain each of constituents (A) to (E), but not in the claimed amounts (CE4).

TABLE 2

Flexural Modulus and Elongation-at-Break of IE1 to IE4 and CE1 to CE4.

| Ex. No. | Flex. Modulus (MPa) | Is Flex. Modulus < 300 MPa? (Pass or Fail) | Elong.-at-Break (%) | Heat aged Elong.-at-Break (%) | Is Heat aged Elong.-at-Break > 350%? (Pass or Fail) |
|---|---|---|---|---|---|
| IE1 | 16 | Pass | 813 | 680%* | Pass* |
| IE2 | 134 | Pass | 770 | 628 | Pass |
| IE3 | 206 | Pass | 711 | 599 | Pass |
| IE4 | 286 | Pass | 668 | 573 | Pass |
| CE1 | 201 | Pass | 525 | 208 | Fail |
| CE2 | 338 | Fail | 544 | 477 | Pass |
| CE3 | 315 | Fail | 18 | 7.6 | Fail |
| CE4 | 471 | Fail | 516 | 309 | Fail |

The properties reported in Table 2 are measured on the unaged polyolefin formulations or unaged comparative formulations except where "Heat aged" indicates the properties are measured on the heat-aged polyolefin products or heat-aged comparative products made therefrom. In Table 2, the * indicates estimated values.

As shown in Table 2, the unaged polyolefin formulations beneficially have a flexural modulus of less than 300 megapascals (MPa) measured according to ASTM D790-15e2. The inventive heat-aged polyolefin products made therefrom by heat aging beneficially have an elongation-at-break of greater than 350% measured according to ASTM D638-14.

TABLE 3

Mechanical Properties of IE1 to IE4 and CE1 to CE4.

| Ex. No. | Tensile Strength (MPa) | Heat Aged Tensile Strength (MPa) |
| --- | --- | --- |
| IE1 | 18.58 | 18.2 to 18.9* |
| IE2 | 20.30 | 19.92 |
| IE3 | 21.64 | 21.72 |
| IE4 | 24.87 | 24.26 |
| CE1 | 18.59 | 12.25 |
| CE2 | 19.04 | 17.42 |
| CE3 | 12.74 | 14.75 |
| CE4 | 21.20 | 21.52 |

The properties reported in Table 3 are measured on the unaged polyolefin formulations or unaged comparative formulations except where "Heat aged" indicates the properties are measured on the heat-aged polyolefin products or heat-aged comparative products made therefrom. In Table 3, the * indicates estimated values.

As shown in Table 3, both the inventive unaged polyolefin formulations of IE1 to IE4 and the inventive heat-aged polyolefin products of IE1 to IE4 made therefrom beneficially have tensile strengths of greater than 8.5 MPa measured according to ASTM D638-14.

IE3 is a repeat of a prior making and testing experiments by a different person. The prior experiments produced a sample having flexural modulus of 211 MPa, elongation-at-break of 647%, heat aged elongation-at-break of 477%, tensile strength of 20.8 MPa, and heat aged tensile strength of 15.3 MPa.

As shown by the Examples, the inventive unaged polyolefin formulation has improved (increased) flexibility and improved (increased) resistance to the flexibility-decreasing effects of heat-aging (collectively, "initial inventive benefits"). The improved (increased) flexibility is indicated by a flexural modulus of less than 300 MPa and, optionally, a lower flexural modulus, relative to that of a comparative formulation. The improved (increased) resistance to heat-aging effects is indicated by the resulting heat-aged polyolefin product having an elongation-at-break of 350% or higher. The improved (increased) resistance to heat-aging effects is indicated by the resulting heat-aged polyolefin product having tensile strength of greater than 8.5 MPa after the heat aging. Thus, the inventive unaged polyolefin formulation and inventive heat-aged polyolefin product made therefrom by heat aging are more useful in industry applications that benefit from flexibility and resistance to heat aging, such as, for example, as a coating layer (e.g., insulation layer) of a medium voltage (MV), high voltage (HV), or extra-high voltage (EHV) power cable. Beneficially, the polyolefin formulation is not crosslinked, and therefore does not have to be crosslinked in order to be used as a coating layer in such power cables, and therefore the inventive materials and coating layer are beneficially recyclable. The polyolefin formulation and heat-aged polyolefin product may have additional benefits and may be used in other industries such as aerospace, automotive, and medical applications.

The following claims are incorporated here by reference.

The invention claimed is:

1. A polyolefin formulation comprising constituents (A) to (E) in the following amounts: from 15.0 to 55.0 weight percent (wt %) of (A) a polypropylene homopolymer; from 77.9 to 30.0 wt % of (B) a poly(ethylene-co-1-alkene) copolymer; from 3.0 to 6.5 wt % of (C) an ethylene/propylene diblock copolymer; from 4.0 to 8.0 wt % of (D) a saturated-and-aromatic ($C_{14}$-$C_{60}$) hydrocarbon; and from 0.1 to 1.5 wt % of (E) an antioxidant; wherein the wt % of (B) divided by the wt % (A) is a mass ratio of from 5.0:1.0 to 0.54:1.0; and wherein the amounts of constituents (A), (B), and (C) total from 88.0 to 95.9 wt % of the polyolefin formulation; and wherein the amounts of constituents (A) to (E) total from 92.1 to 100.0 wt % of the polyolefin formulation.

2. The polyolefin formulation of claim 1 wherein the polyolefin formulation is an unaged polyolefin formulation that has not been subjected to heat aging and has features (i) and (ii) and, optionally, feature (iii): (i) a flexural modulus of less than 300 megapascals (MPa) measured according to ASTM D790-15e2; and (ii) an elongation-at-break of greater than or equal to 550 percent (%) measured according to ASTM D638-14; and, optionally, (iii) a tensile strength of greater than 8.5 MPa measured according to ASTM D638-14.

3. The polyolefin formulation of claim 1 wherein subjecting the unaged polyolefin formulation to heat aging for 10 days at 135 degrees Celsius (° C.) yields a heat-aged polyolefin product that has feature (i) and, optionally, feature (ii): (i) an elongation-at-break of greater than 350 percent (%) measured according to ASTM D638-14; and, optionally, (ii) a tensile strength of greater than 8.5 MPa measured according to ASTM D638-14.

4. The polyolefin formulation of claim 1 having any one of features (i) to (v): (i) the (A) polypropylene homopolymer has a density from 0.89 to 0.93 gram per cubic centimeter (g/cm$^3$) measured according to ASTM D792-13, method B, and a melt flow rate (MFR$_2$) from 1.0 to 10 grams per 10 minutes (g/10 min.) measured according to ASTM D-1238 at 230° C., 2.16 kg; (ii) wherein the (B) poly(ethylene-co-1-alkene) copolymer is a poly(ethylene-co-1-butene) copolymer that has a density from 0.850 to 0.890 g/cm$^3$ measured according to ASTM D792-13, method B, and a melt index (I$_2$) from 0.1 to 5.0 g/10 min. measured according to ASTM D-1238 at 190° C., 2.16 kg; (iii) wherein the (C) ethylene/propylene diblock copolymer has a melt flow rate (MFR$_2$) from 4 to 8 g/10 min. measured according to ASTM D-1238 at 260° C., 2.16 kg; (iv) wherein the (D) saturated-and-aromatic ($C_{14}$-$C_{60}$) hydrocarbon is a saturated-and-aromatic ($C_{19}$-$C_{23}$) hydrocarbon; (v) wherein the antioxidant is a sulfur atom-containing compound.

5. A method of making the polyolefin formulation of claim 1, comprising melt-mixing constituents (A), (B), and (C) at a temperature of from 180 to 220 degrees Celsius (° C.) for a mixing-effective period of time to give a premixture of constituents (A), (B), and (C) and free of constituents (D) and (E); and soaking or imbibing constituents (D) and (E) into the premixture at a temperature from 80° to 100° C. for an absorbing-effective period of time of at least 4 hours to give the polyolefin formulation comprising constituents (A) to (E).

6. A heat-aged polyolefin product made by subjecting the polyolefin formulation of claim 1 to heat aging conditions comprising a temperature of from 50 to 140 degrees Celsius (° C.) and a heat aging-effective time period of 10 days or longer and an air atmosphere.

7. A manufactured article comprising or made from the polyolefin formulation of claim 1.

8. A coated conductor comprising a conductive core and an insulation layer comprising the polyolefin formulation of claim 1 at least partially covering the conductive core.

9. A method of conducting electricity, the method comprising applying a voltage across the conductive core of the coated conductor of claim 8 so as to generate a flow of electricity through the conductive core.

10. A method of recycling the polyolefin formulation of the insulation layer of the coated conductor of claim 8, the method comprising crushing the polyolefin formulation to give a crushed product, and pelletizing the crushed product to give pellets of recycled polyolefin formulation.

* * * * *